United States Patent
Doepfert et al.

(10) Patent No.: US 12,188,542 B2
(45) Date of Patent: Jan. 7, 2025

(54) TRANSMISSION FOR A POWER TRAIN OF A MOTOR VEHICLE, AND POWER TRAIN HAVING SUCH A TRANSMISSION

(71) Applicant: ZF Friedrichshafen AG, Friedrichshafen (DE)

(72) Inventors: Hagen Doepfert, Lindau (DE); Tamas Gyarmati, Bermatingen (DE); Matthias Reisch, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/505,331

(22) Filed: Nov. 9, 2023

(65) Prior Publication Data
US 2024/0159298 A1 May 16, 2024

(30) Foreign Application Priority Data
Nov. 10, 2022 (DE) ..................... 10 2022 211 901.0

(51) Int. Cl.
| | |
|---|---|
| *F16H 1/48* | (2006.01) |
| *B60K 17/04* | (2006.01) |
| *F16H 57/029* | (2012.01) |
| *F16H 57/04* | (2010.01) |
| *F16H 57/02* | (2012.01) |

(52) U.S. Cl.
CPC .............. *F16H 1/48* (2013.01); *B60K 17/04* (2013.01); *F16H 57/029* (2013.01);
(Continued)

(58) Field of Classification Search
CPC ...... F16H 1/48; F16H 57/029; F16H 57/0421; F16H 57/0471; F16H 2057/02043;
(Continued)

(56) References Cited

U.S. PATENT DOCUMENTS 3,365,986 A * 1/1968 Mazziotti .............. F16H 1/2809
475/346
3,459,070 A * 8/1969 Holdeman ................ F16H 1/46
475/346
(Continued)

FOREIGN PATENT DOCUMENTS

| DE | 2313688 A | 9/1973 |
|---|---|---|
| DE | 102011108170 A1 | 1/2013 |

(Continued)

OTHER PUBLICATIONS

English translation of DE102011108170A1; http://translationportal.epo.org; Aug. 6, 2024 (Year: 2024).*
(Continued)

*Primary Examiner* — Roger L Pang
(74) *Attorney, Agent, or Firm* — Dority & Manning, P.A.

(57) ABSTRACT

A transmission for a power train of a motor vehicle has a first stationary housing part having a first axial contact surface, a second stationary housing part, and a first sealing element on the second stationary housing part, the first sealing element being axially compressible. Additionally, the transmission includes a first planetary gear set including a planet carrier, at least one planet gear, a sun gear, and a ring gear. The planet carrier is fixed relative to one or both of the first stationary housing part and the second stationary housing part. One side of the planet carrier rests against the first axial contact surface, where the first sealing element acts on another side of the planet carrier to axially preload the planet carrier against the first axial contact surface to prevent the planet carrier from tilting relative to a rotation axis of the first planetary gear set.

17 Claims, 2 Drawing Sheets

(52) U.S. Cl.
CPC ..... *F16H 57/0421* (2013.01); *F16H 57/0471*
(2013.01); *F16H 2057/02021* (2013.01); *F16H 2057/02043* (2013.01)

(58) Field of Classification Search
CPC ......... F16H 2057/02021; F16H 57/082; B60K 17/04; B60K 17/046
USPC ................ 475/331, 159, 348, 347; 74/606 R
See application file for complete search history.

(56) References Cited

U.S. PATENT DOCUMENTS

| | | | |
|---|---|---|---|
| 3,770,075 A | | 11/1973 | Vegners |
| 4,649,772 A | * | 3/1987 | Daniel ................... F16D 55/40 |
| | | | 180/10 |
| 5,609,538 A | * | 3/1997 | Nogle ................. F16H 57/0482 |
| | | | 475/159 |
| 2009/0215568 A1 | * | 8/2009 | Shibukawa .......... B60K 17/046 |
| | | | 475/159 |

FOREIGN PATENT DOCUMENTS

| | | |
|---|---|---|
| DE | 102021207527 A1 | 1/2023 |
| WO | WO 2005/120877 A1 | 12/2005 |

OTHER PUBLICATIONS

English translation of DE102021207527A1; http://translationportal.epo.org; Aug. 8, 2024 (Year: 2024).*
German Office Action DE 10 2022 211 901.0, dated Aug. 23, 2023. (8 pages).

* cited by examiner

TRANSMISSION FOR A POWER TRAIN OF A MOTOR VEHICLE, AND POWER TRAIN HAVING SUCH A TRANSMISSION

CROSS-REFERENCE TO RELATED APPLICATION

The present application is related and has right of priority to German Patent Application No. 10 2022 211 901.0 filed on Nov. 10, 2022, the entirety of which is incorporated by reference for all purposes.

FIELD OF THE INVENTION

The invention relates generally to a transmission which includes at least a first planetary gear set with a housing-fixed planet carrier. The invention further relates generally to a power train with at least one such transmission.

BACKGROUND

DE 10 2011 108 170 A1 describes a motor vehicle that includes an internal combustion engine, an electric machine, and a housing, where the housing surrounds at least one planetary transmission. The planetary transmission couples the internal combustion engine and the electric machine to one another, and includes at least a sun gear, a planet carrier, a planet gear, and a ring gear. The planetary transmission has a separate recirculating lubrication system, which includes a lubricant reservoir, a system of bores in a portion of the transmission for transporting a lubricant to at least one component in the planetary transmission, a feed of the lubricant to a contact point between two parts of the planetary transmission that are movable relative to one another, and a rotating drive element for the lubricant, which is an integral part in the planetary transmission, for accelerating the lubricant. In one embodiment, the ring gear and the sun gear of the planetary transmission are rotatable, and the planet carrier is fixed to the housing. The planet carrier has a first lubricant guide, which is inclined relative to the horizontal plane, for guiding the lubricant from the planet carrier to the sun gear, and a second lubricant guide for guiding the lubricant from the planet carrier to a bearing of a planet gear. The bearing of the planet gear is, for example, a needle bearing or a plain bearing. The rotatable sun gear is, for example, a first drive element of the planetary transmission for driving the lubricant. The rotatable sun gear has lubricant guides for guiding the lubricant in a direction away from the center of rotation of the drive element. The rotatable sun gear is, for example, a second drive element, and forms a gap between a portion of its surface and a face of a stationary part of the planetary transmission.

SUMMARY OF THE INVENTION

The problem addressed by the present invention is that of providing a compact power train and a compact transmission, the transmission having a housing-fixed planet carrier, which, in particular, is prevented from tilting during the assembly of the transmission and during the operation of the transmission.

A transmission for a power train of a motor vehicle has, according to a first aspect of the invention, at least a first planetary gear set including a housing-fixed planet carrier, on which at least one planet gear is rotatably mounted, and a sun gear and a ring gear, each of which is meshed with the at least one planet gear. The planet carrier comes to rest on one side against at least a first axial contact surface of a first stationary housing part and, on the other side, is axially preloaded against the at least first axial contact surface by an axially compressible first sealing element, which is arranged on a second stationary housing part, in order to prevent the planet carrier from tilting relative to a rotation axis of the first planetary gear set.

In other words, due to the stationary or housing-fixed planet carrier, the transmission is a stationary transmission, which is usable in different areas of application. In particular, the transmission is usable in an integral differential of a power train, i.e., as a differential gear. The invention is not limited only to the use of the transmission in differential gears, however. The term "housing-fixed" is considered to mean, in the present case, that relative motion does not takes place or cannot take place between the housing-fixed planet carrier and the housing of the transmission as well as between the housing-fixed planet carrier and the particular stationary housing part. The planet carrier, as well as the particular stationary housing part, is axially fixed, radially fixed, and non-rotatable in relation to the rest of the transmission housing.

The planet carrier comes to rest on one side directly against the at least first axial contact surface of the first stationary housing part and, on the other side, at least indirectly against the second stationary housing part. "At least indirectly" means, in this context, that the planet carrier either comes to rest directly against the second housing part or that yet another or multiple further component(s) is/are arranged between the planet carrier and the second housing part, which transmit an axial load between the planet carrier and the second housing part and, if necessary, generate an axial preload force.

According to the first aspect of the invention, the axial preloading of the planet carrier with respect to the transmission housing, which includes at least the first and the second housing parts, is implemented by the first sealing element, which also ensures a sealing effect, in particular when the transmission has a lubricant chamber as described in the following. The first sealing element is axially compressed when the transmission is assembled and, as a result, generates an axial preload force, such that the first sealing element presses the planet carrier in the direction of or "towards" the first axial contact surface. As a result, the planet carrier comes to rest against the first housing part, as a result of which the planet carrier is prevented from assuming a slanted position in relation to the transmission housing during and after assembly. Therefore, the planet carrier is positioned in the desired position with respect to the housing. A slanted position of the planet carrier would result in undesired stress peaks in the first planetary gear set, which would ultimately damage the first planetary gear set. The axial preloading of the planet carrier causes a central axis of the particular planet gear to be arranged substantially axially parallel to a rotation axis of the first planetary gear set during the operation of the transmission and to remain in this position during the operation of the transmission. In addition, the axial preloading of the planet carrier causes the common theoretical central axis of the planet gear or, if applicable, of the planet gears, to be oriented perpendicularly to the first axial contact surface. As a result, a uniform load on the first planetary gear set is facilitated.

In this sense, an axially compressible first sealing element is arranged between the planet carrier and a fixed second housing part on a side of the planet carrier situated opposite the first contact surface. The first sealing element axially preloads the planet carrier when the transmission is assembled, such that a central axis of the particular planet gear is arranged substantially axially parallel to a rotation axis of the first planetary gear set during the operation of the transmission.

The first planetary gear set is preferably part of a planetary transmission, the first planetary gear set having, as gear set elements, a first sun gear, a first ring gear, and multiple planet gears, which are guided by a first planet carrier on a circular path around the first sun gear. Advantageously, the first planetary gear set has precisely one stationary gear ratio. In one possible embodiment of the transmission, the first planetary gear set is the reverse gearing of an integral differential. The planetary transmission can have a second planetary gear set, which similarly includes, as gear set elements, a second sun gear, a second ring gear, and multiple planet gears, which are guided by a second planet carrier on a circular path around the second sun gear.

Within the scope of the invention, a sealing element is an element that is used to seal a first chamber with respect to a second chamber or with respect to an external atmosphere. The first sealing element is used, in particular, to seal a lubricant chamber. Preferably, the first sealing element is an O-ring or a tubular seal. In principle, any type of sealing element is conceivable that seals axially and is installable such that it generates an axial preload, via compression if necessary. The first sealing element according to the first aspect of the invention is an axial seal, which is arranged in a gap between two radial end faces. Recesses, in particular grooves, which accommodate the first sealing element, are defined in the planet carrier and/or in the second housing part.

A transmission according to the invention for a power train of a motor vehicle has, according to a second aspect of the invention, at least a first planetary gear set, the first planetary gear set including a housing-fixed planet carrier, on which at least one planet gear is rotatably mounted, and a sun gear and a ring gear, each of which is meshed with the at least one planet gear. The planet carrier comes to rest on one side against at least a first axial contact surface of a first stationary housing part and, on the other side, is axially preloaded against the at least first axial contact surface by an axially compressible spring element, which is arranged on a second stationary housing part, in order to prevent the planet carrier from tilting relative to a rotation axis of the first planetary gear set. A spring element is any spring-loaded element that generates an axial preload force for axially preloading the planet carrier with respect to the first axial contact surface.

In other words, an axially compressible spring element is arranged between the planet carrier and the fixed second housing part, on a side of the planet carrier situated opposite the first contact surface. The spring element axially preloads the planet carrier when the transmission is assembled such that a central axis of the particular planet gear is arranged substantially axially parallel to a rotation axis of the first planetary gear set during the operation of the transmission.

The axial preloading of the planet carrier with respect to the transmission housing is implemented by the spring element. The spring element is preferably axially compressed and, as a result, axially preloaded, when the transmission is assembled, such that the spring element presses the planet carrier in the direction of the first contact surface. With respect to the advantages of the spring element, reference is made to the preceding comments presented with respect to the first sealing element. It is conceivable that multiple spring elements are provided, which, connected in series or in parallel, generate a uniform axial preloading of the planet carrier with respect to the first housing part. Depending on the design of the transmission, the spring element is usable in addition, or as an alternative, to the first sealing element. For the case in which at least one spring element is used to axially preload the planet carrier, the first sealing element is alternatively formed and arranged as a radial sealing element or as a radial seal, which therefore exclusively implements a sealing effect. A radial seal is arranged in a gap between two, in particular cylindrical, circumferential surfaces. It is also conceivable, however, that the first sealing element and the spring element generate the desired axial preload force jointly, i.e., connected in parallel.

A transmission according to the invention for a power train of a motor vehicle has, according to a third aspect of the invention, at least a first planetary gear set including a housing-fixed planet carrier, on which at least one planet gear is rotatably mounted, and a sun gear and a ring gear, each of which is meshed with the at least one planet gear. The planet carrier comes to rest on one side against at least a first axial contact surface of a first stationary housing part and, on the other side, at least indirectly against a second stationary housing part. The planet carrier is secured via a driving tooth system so as to be non-rotatable with respect to the second housing part, wherein a meshing angle of the driving tooth system axially preloads the planet carrier with respect to the first housing part, so that the planet carrier is prevented from tilting relative to a rotation axis of the first planetary gear set.

In other words, the axial preloading of the planet carrier is implemented via a suitable meshing angle of the driving tooth system of the planet carrier. In this sense, the driving tooth system is preferably arranged on the end face of the planet carrier. The planet carrier turns easily under torque load, wherein the tooth flanks resting against one another glide off of each another such that the planet carrier is pressed in the direction of the first axial contact surface on the first housing part. The meshing angle is therefore selected such that the gliding of the tooth flanks off of one another causes the planet carrier to be displaced in relation to the fixed first housing part and in the direction of the first housing part, such that the planet carrier is pressed against the first axial contact surface. The meshing angle is greater than the angle that brings about self-locking, so that an axial preload force is generatable.

The driving tooth system enables simple installation of the planet carrier of the first planetary gear set and simultaneously ensures a secure, corotational connection with respect to the housing of the transmission. The driving tooth system is intended, in particular, to secure the planet carrier against rotation about its own main axis or about a longitudinal axis or about the rotation axis of the first planetary gear set. Therefore, torque of the transmission is supported at the housing via the planet carrier and the driving tooth system.

The driving tooth system has a tooth system on the planet carrier and a tooth system on the first housing part, wherein the tooth systems are intermeshed. The driving tooth system is preferably arranged on a side piece of the planet carrier in its radially outer or radially inner area. In the radially outer area, the tooth system on the planet carrier is external toothing, which meshes with internal toothing on the stationary housing part. In the radially inner area, the tooth system on the planet carrier is internal toothing, which meshes with external toothing on the stationary housing part. The driving tooth system enables installation of the planet carrier on the stationary housing part in the axial direction, wherein the planet carrier is axially secured with respect to the stationary housing part via suitable means, for example, a housing element, in particular a cover of the transmission housing.

Further, the driving tooth system is preferably arranged at or on an axial end face of the planet carrier. If the driving tooth system is attached to the planet carrier radially outwardly (as external toothing), it is advantageous to be able to remove the planet carrier from the mold, for example, in the radial direction, when the planet carrier is produced using die casting technology. If the driving tooth system is attached to the planet carrier radially inwardly (as internal toothing), the driving tooth system must be provided on or at the axial end face of the planet carrier.

The driving tooth system is preferably produced via casting. As a result, mechanical, in particular machining-based re-working is not necessary, as a result of which the manufacturing costs of the relevant component are reduced.

For the transmission according to the first, the second and the third aspects of the invention, in one preferred embodiment, the at least one planet gear of the first planetary gear set is rotatably mounted on the planet carrier via a planetary bearing, wherein a lubricant chamber for supplying the planetary bearing with lubricant is arranged at least partially around the rotation axis of the first planetary gear set, wherein the lubricant chamber is spatially delimited by the planet carrier and the stationary first housing part, and wherein the planet carrier comes to rest at least against the first axial contact surface of the first housing part while also sealing the lubricant chamber.

The lubricant chamber is provided for guiding a lubricant and is an at least partially annular duct extending around the rotation axis of the first planetary gear set. Within the scope of this invention, a lubricant is considered to be a means for lubricating the intermeshed teeth of the gear set elements of the first planetary gear set. A lubricant is also considered to be a coolant, which is guided in the lubricant chamber. Oil, for example, is suitable for use as lubricant. The lubricant chamber has at least one inlet and at least one outlet. In addition, the lubricant chamber is connected to the connecting sections, which guide the lubricant to the particular planet gear, in particular to bearings of the particular planet gear, in order to lubricate and, if necessary, cool the particular planet gear as well as the ring gear and the sun gear in mesh therewith. The lubricant chamber is formed and spatially delimited or defined by the planet carrier and the first housing part.

A spatial delimitation is considered to mean that the lubricant cannot inadvertently emerge from the lubricant chamber radially and axially between the planet carrier and the first stationary housing part. The planet carrier is therefore technically sealed with respect to the first housing part. "Sealed" is considered to mean that the lubricant guided in the lubricant chamber cannot inadvertently emerge from the lubricant chamber. Leaks are therefore prevented. It is also conceivable, however, that a small amount of leakage or a minor leak of lubricant out of the lubricant chamber is intentionally accepted between the planet carrier and the first housing part, wherein the emerging amount of lubricant is so low, however, that a sufficient amount of lubricant is still conveyed through the lubricant chamber, and wherein, simultaneously, even further components, in addition to the planet gears, are lubricated and/or cooled with the lubricant guided in the lubricant chamber. A means for supplying lubricant for the planetary bearings on the planet carrier is therefore formed, in which the lubricant duct is substantially formed or defined by the planet carrier and the first housing part.

The lubricant chamber is fluidically connected to a pump, which conveys the lubricant into the lubricant chamber via the particular inlet. The pump is preferably fixed on the housing of the transmission and conveys the lubricant into the lubricant chamber directly or indirectly, i.e., via further ducts. The pump conveys the lubricant out of a lubricant sump, which is fluidically connected to the outlet of the lubricant chamber. From the lubricant chamber, the lubricant therefore at least indirectly flows back into the lubricant sump via the outlet.

Provided that the first planetary gear set has multiple planet gears, the lubricant chamber extends around the rotation axis of the first planetary gear set, in particular such that the lubricant is guided to each of the planet gears. Due to a suitable arrangement of the angular position of the planet gears in the first planetary gear set, a full-perimeter lubricant chamber or duct is omitted, such that, ultimately, less lubricant is necessary, wherein the lubricant is guided mainly to the planet gears.

The wording "the planet carrier is arranged on the first stationary housing part while also sealing the lubricant chamber" is considered to mean that the planet carrier comes to rest against the first housing part, i.e., is supported directly thereon. It is further considered to mean that the planet carrier is arranged with respect to the stationary housing part such that the planet carrier does not come to rest directly against the stationary housing part to create the sealing, but rather that a sealing effect is generated therebetween, for example, by a sealing element arranged therebetween. In addition, the wording is considered to mean that the first housing part is, optionally, attachable directly to the planet carrier, or vice versa, which would require no further connection of the planet carrier to the rest of the transmission housing. In such instance, the planet carrier is therefore not supported against, but fixed to, the first housing part. This is possible, for example, when the first housing part is a cover of the planet carrier.

When the transmission has a driving tooth system according to the third aspect of the invention, the driving tooth system is preferably within the lubricant chamber. A lubricant film forms between the teeth of the particular tooth system that come into contact with one another and has a particularly positive effect on the acoustic properties of the transmission. It is also conceivable, of course, to provide the driving tooth system outside the lubricant chamber, for example, when this is specified by the available installation space.

A transmission according to the invention for a power train of a motor vehicle has, according to a fourth aspect of the invention, at least a first planetary gear set including a housing-fixed planet carrier, on which at least one planet gear is rotatably mounted via a planetary bearing, and a sun gear and a ring gear, each of which is meshed with the at least one planet gear. A lubricant chamber for supplying the planetary bearing with lubricant is arranged at least partially around a rotation axis of the first planetary gear set, wherein the lubricant chamber is spatially delimited by the planet carrier and a first stationary housing part. The planet carrier comes to rest against the first stationary housing part while also sealing the lubricant chamber. A fluid pressure of the lubricant guided in the lubricant chamber is so high during the operation of the transmission that the planet carrier is axially preloaded with respect to the first housing part, thereby preventing the planet carrier from tilting with respect to a rotation axis of the first planetary gear set.

The axial preloading of the planet carrier with respect to the transmission housing, in particular the first housing part, is implemented by the lubricant guided in the lubricant chamber. The fluid pressure in the lubricant chamber that is set during the operation of the transmission causes the planet carrier of the first planetary gear set to be pressed in the direction of the first axial contact surface on the first housing part. The fluid pressure in the lubricant chamber is therefore used to press the planet carrier axially against the first contact surface on the first housing part. With respect to the advantages, reference is made to the preceding comments presented with respect to the first sealing element. Depending on the design of the transmission, the utilization of the fluid pressure in the lubricant chamber is applicable in addition, or alternatively, to the first sealing element and/or to the spring element.

The comments presented in the following are similarly applicable to all inventive aspects of the transmission described above. In other words, the following portion of the description applies for the transmission according to the first aspect of the invention, for the transmission according to the second aspect of the invention, for the transmission according to the third aspect of the invention, and for the transmission according to the fourth aspect of the invention.

Preferably, the first housing part and the second housing part form a transmission housing of the transmission, wherein the first and the second housing parts are attached to one another. The housing parts are, in particular, bolted together. The bolted connection of the two housing parts causes the first sealing element or the spring element to be axially preloaded, in particular in the case of a transmission according to the first and the second aspects of the invention.

Preferably, the first housing part or the second housing part forms a cover element of the transmission housing. In other words, one of the housing parts forms the main housing section of the transmission housing and defines an interior space, whereas the other housing part merely closes the interior space and spatially delimits the transmission housing. The housing part that is formed as the cover element has a type of plate shape with or without a collar, which at least partially axially closes the main housing.

Preferably, at least one planet shaft is arranged on the planet carrier, the planet shaft accommodating the planetary bearing for rotatably mounting the associated planet gear. The planetary bearing is, for example, a needle bearing, wherein lubricant is supplied to the particular planet gear via a planet shaft, which is non-rotatably arranged on the planet carrier and accommodates the planetary bearing for mounting the particular planet gear. Preferably, in some embodiments, multiple planet shafts are arranged on the planet carrier, each of which accommodates a planetary bearing for rotatably mounting an associated planet gear. Provided that a lubricant chamber is provided, means for securing the particular planet shaft are preferably arranged in this lubricant chamber.

In the case of a transmission having a lubricant chamber, the particular planet shaft includes axially and/or radially extending ducts in order to fluidically connect the lubricant chamber at least indirectly to the planetary bearing. The ducts are arranged on the planet shaft such that they are produced simply. For example, the ducts are bores in the planet shaft, which intersect or meet one another, in order to be fluidically connected to one another. The ducts at least indirectly fluidically connect the lubricant chamber to the planetary bearings.

Further preferably, an orifice bore is arranged on the axially and/or radially extending duct. The orifice bore, which is also referred to simply as an orifice, is considered to be a local taper, which has a smaller through-flow cross-section than the cross-section of the ducts on the planet shaft. It is also conceivable that at least one of the ducts on the planet shaft is an orifice bore. A lubricant pressure is set by the orifice, such that the desired amount of lubricant always reaches the particular planetary bearing arranged thereon via the planet shafts.

Preferably, means for securing the particular planet shaft is provided. Such means is, for example, a pin, which extends radially on the planet shaft. Therefore, in some instances, the means for securing the planet shaft is a radial pin, which prevents the planet shaft from shifting axially in an axial direction. In the opposite axial direction, the planet shaft is supported against the planet carrier. In addition, in some instances, the means for securing the planet shaft prevents a turning motion in relation to the planet carrier. Alternatively, or additionally, in some instances, the means for securing the planet shaft is a securing ring and/or a snap ring. Preferably, recesses or indentations are formed or defined in the planet carrier and are provided for accommodating the means for securing the planet shaft. In addition, the recesses are designed such that the means for securing the planet shaft, in particular a pin, is easily installed.

In one embodiment, preferably at least a second sealing element is arranged between the planet carrier and the stationary housing part. Similar to the above-described first sealing element, the second sealing element, in particular, seals the lubricant chamber. The second sealing element is advantageous, in particular, for the case in which a sealing effect brought about by the planet carrier coming to rest axially against the first housing part, or vice versa, is not sufficient. For this purpose, recesses, in particular grooves, are provided or defined in the planet carrier and/or in the second housing part, which accommodate the second sealing element. O-rings or tubular seals, for example, are suitable for use as a second sealing element. Due to a suitable arrangement of the second sealing element, the lubricant chamber is enlarged in a specific manner in order to supply further elements of the transmission with lubricant.

Preferably, the planet carrier and/or the first housing part and/or the second housing part are/is produced at least partially via casting. As a result, the transmission is particularly cost-effectively produced. In addition, the components are made more slender and lighter.

The first housing part and/or the second housing part preferably axially secures and/or centers the planet carrier. The planet carrier is centered either on or in the first housing part or the second housing part. When the planet carrier is centered on the first housing part or on the second housing part, the first or the second housing part has an external geometry or an internal geometry, which accommodates the planet carrier for centering. Alternatively, or additionally, the first housing part or the second housing part—in this case a first housing part or a second housing part arranged on the main housing and at least axially coming to rest thereon—has an end-face contact surface, against which the planet carrier is axially supported and, as a result, axially secured.

The transmission according to the first, the second, the third and/or the fourth aspect(s) of the invention is suitable, in particular, for use in an integral differential for a power train of a motor vehicle. The integral differential includes such a transmission, wherein the transmission has a first planetary gear set and a second planetary gear set operatively connected to the first planetary gear set. With an integral differential, two wheel torques are not combined to form a single axle torque in a rotating component. Instead, drive power is divided in the integral differential and applied onto the output shafts operatively connected to the first and the second planetary gear sets. As a result, the components in the integral differential are lighter due to the respective, relatively low torques they have to accommodate. This also results in smaller components and a weight reduction. Such a differential both converts and distributes the torque, which previously required two separate assemblies instead of this single, integral assembly. The invention is therefore a combined transmission and differential, which converts as well as distributes torque onto the output shafts.

The term "operatively connected" is considered to be a connection between two components that cannot be shifted, resulting in a permanent transmission of drive power, in particular of rotational speed and/or torque. The connection is implementable directly or via a fixed ratio. The connection is implementable, for example, via a fixed shaft, gear teeth, in particular on a spur gear, and/or with a belt.

The term "at least indirectly" is considered to mean that two components are (operatively) connected to one another via at least one other component, located between the two components, or that the two components are directly connected to one another. Other components are also arrangeable between shafts or gear wheels, which are operatively connected to the shaft or to the gear wheel. In addition, duct sections of the lubricant duct are fluidically connected to one another directly or indirectly or via further ducts.

An integral differential is considered to be a differential that has both a first planetary gear set and a second planetary gear set in the framework of this invention, wherein the first planetary gear set is drivingly connected, for example, to an input shaft, to the second planetary gear set and to a first output shaft. The second planetary gear set is drivingly connected to a second output shaft. The input torque to the input shaft is convertible by such an integral differential and is distributable and transmittable at a defined ratio onto the two output shafts. Preferably, 50%, i.e., one half, of the input torque is transmitted onto each of the output shafts. Therefore, the differential does not have a component that is subjected to both output torques. In other words, the two torques are never combined. Furthermore, the differential has no gears that rotate in a block, or without a rolling motion, when the output rotational speeds of the output shafts are identical. Consequently, the intermeshed components in the differential always rotate in relation to one another, independently of the output rotational speeds of the output shafts. The output shafts of the differential are particularly each at least indirectly connected to a respective wheel on the motor vehicle.

A "shaft" is considered to be a rotatable component in the transmission with which various components in the transmission are connected to one another for conjoint rotation or with which a connection of this type is established upon actuation of an appropriate shift element. The respective shaft connects the components axially or radially, or even axially and radially, to one another. A shaft does not have to be a, for example, cylindrical, rotatably mounted machine element for transmitting torques, instead, it is any connecting element that connects individual components or elements to one another, in particular a connecting element that connect numerous elements to one another for conjoint rotation.

A power train according to the invention for a motor vehicle has, according to a fifth aspect of the invention, at least one drive unit, which generates drive power and distributes said drive power onto at least one output shaft at least indirectly via at least one transmission according to the first, the second, the third and/or the fourth aspect(s) of the invention. The drive unit is preferably an electric machine, wherein a rotor shaft of a rotor of the electric machine is connected or coupled to an input of the integral differential, in particular to the ring gear or to the sun gear of the first planetary gear set or to one of the gear set elements of a second planetary gear set of the differential, for conjoint rotation. The rotor is mounted so as to be rotatable in relation to a stator of the electric machine, said stator being fixed in place on a stator carrier. The electric machine is preferably connected to an accumulator, which supplies the electric machine with electrical energy. The electric machine is also preferably controllable by an open-loop or closed-loop system by a power electronics system. The drive unit is additionally, or alternatively, an internal combustion engine, where the input shaft is, for example, a crankshaft, or is connected to a crankshaft for conjoint rotation.

Preferably, a stator carrier is the stationary first housing part of the transmission. In other words, the transmission and, in particular, the planet carrier, are arranged on the electric machine, wherein the planet carrier is supported against the stator carrier. In this case, the planet carrier and the stator carrier form and spatially delimit the lubricant chamber.

The power train is provided in a motor vehicle, in particular, an automobile (for example, a passenger car weighing less than 3.5 tons), a bus, or a truck (busses and trucks can weigh more than 3.5 tons). In particular, the motor vehicle is an electric vehicle or a hybrid vehicle. The motor vehicle has at least two axles, in which one of the axles is formed by a drive axle that is drivable by the power train. The power train according to the invention is operatively arranged on this drive axle and the power train transmits drive power to at least one of the wheels, preferably onto both wheels, on this axle. It is also conceivable that there is a separate power train of this type for each axle, such that each axle has an axle drive as described above.

The above definitions and explanations of the technological effects, advantages and advantageous embodiments of the transmission according to the invention, according to the first aspect of the invention, also apply analogously to the transmission according to the invention, according to the second, the third and the fourth aspects of the invention, to the integral differential and to the power train according to the invention, according to the fifth aspect of the invention. In particular, it is conceivable to also use the first sealing element according to the first aspect of the invention in the transmission according to the first, the third or the fourth aspect of the invention. It is also conceivable to use the spring element according to the second aspect of the invention in the transmission according to the first, the third and the fourth aspects of the invention. Moreover, it is conceivable to also use a driving tooth system according to the third aspect of the invention in a transmission according to the first, the second or the fourth aspect of the invention. Furthermore, it is conceivable to also use the fluid pressure in the lubricant chamber according to the fourth aspect of the invention in a transmission according to the first, the second or the third aspect of the invention for generating the axial preload force. Therefore, the first, the second, the third and the fourth aspects of the invention can be combined with one another in any way.

BRIEF DESCRIPTION OF THE DRAWINGS

Exemplary embodiments of the invention are explained in greater detail in the following with reference to the drawings, in which identical or similar elements are provided with the same reference characters. Therein.

DETAILED DESCRIPTION

Figure 1:
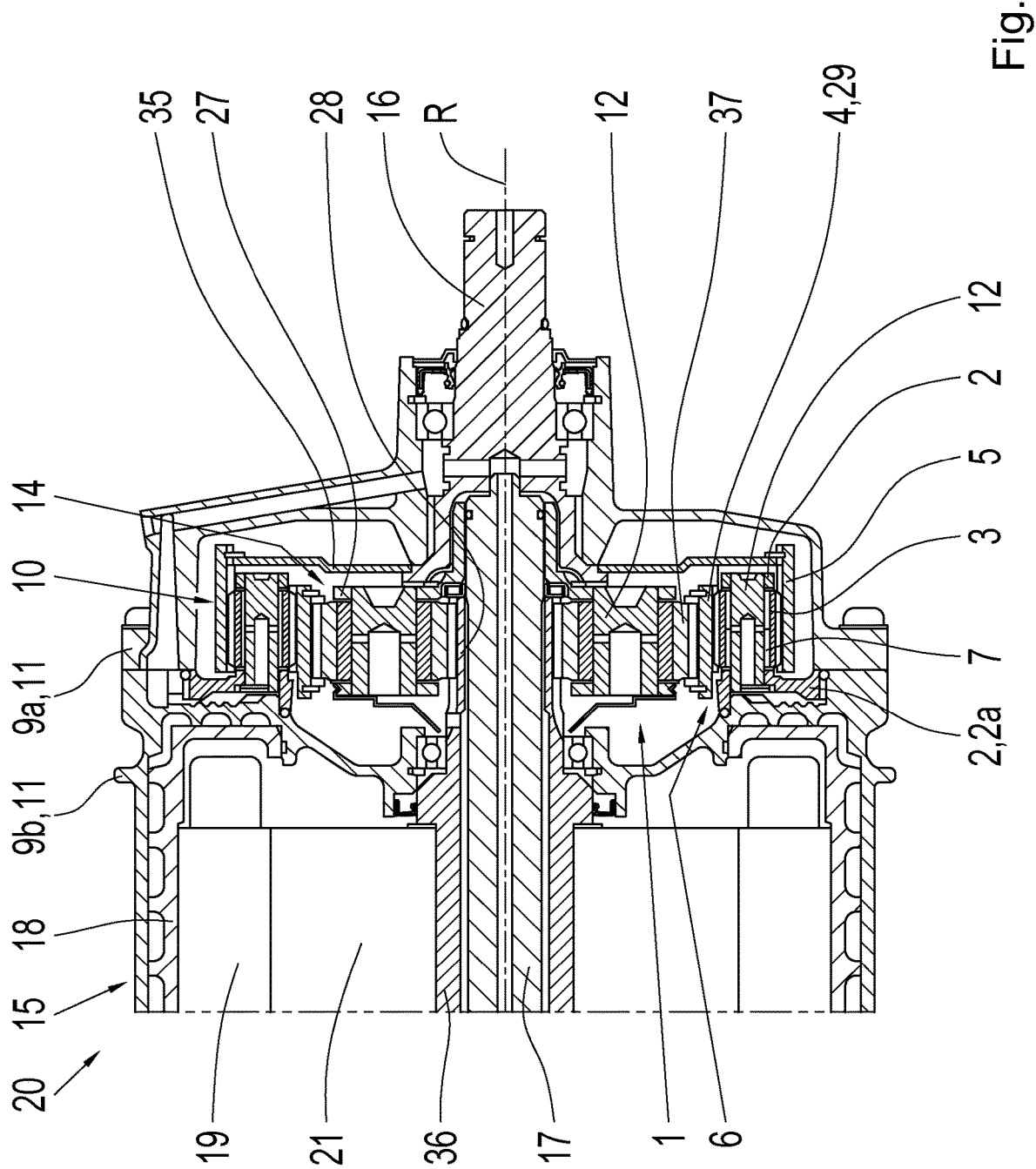
FIG. 1 shows a simplified schematic partial longitudinal sectional view of a power train according to the invention for a motor vehicle with a transmission according to the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a power train 20 according to the invention for a motor vehicle (not shown here) in a partial longitudinal sectional view. The power train 20 is an electric axle drive including a drive unit 15, which is an electric machine. The drive unit 15 generates drive power and distributes said drive power onto two output shafts 16, 17 via an integral differential 10. The drive unit 15 has a stator 19, which is fixed in place on a stator carrier 18, and a rotor 21, which is rotatable relative to the stator 19.

The integral differential 10 of the power train 20 has a transmission 1 that includes a first planetary gear set 6 and a second planetary gear set 14, which is operatively connected to the first planetary gear set 6. The two planetary gear sets 6, 14 are radially nested. Radial nesting saves axial installation space of the power train 20. The differential 10 combines the functions of transmission gearing and the differential function without first forming an axle torque, i.e., the cumulative torque of two wheel torques.

Both planetary gear sets 6, 14 are negative planetary gear sets in the present case and each includes a sun gear 4, 28, a ring gear 5, 29, and a planet carrier 2, 27 as the gear set elements. The first planetary gear set 6 is arranged radially outside the second planetary gear set 14 in the present case. The first planetary gear set 6 has multiple planet gears 3, which are rotatably mounted on planet shafts 12 via planetary bearings 7. The planet shafts 12 in turn are non-rotatably mounted on the planet carrier 2. Similarly, the planet gears 37 of the second planetary gear set 14 are mounted on the second planet carrier 27. The planet carrier 2 of the first planetary gear set 6 is arranged in a housing-fixed manner on a first housing part 9a and on a second housing part 9b of a transmission housing 11. The first housing part 9a and the second housing part 9b form the transmission housing 11 of the transmission 1, wherein the housing parts 9a, 9b are bolted together. In addition, the first housing part 9a is a cover element of the transmission housing 11.

The ring gear 5 of the first planetary gear set 6 is connected to the first output shaft 16 for conjoint rotation via a coupling element 35. The sun gear 4 of the first planetary gear set 6 is formed in one piece with the ring gear 29 of the second planetary gear set 14. The planet carrier 27 of the second planetary gear set 14 is connected to the second output shaft 17 for conjoint rotation. The drive unit 15 drives the sun gear 28 of the second planetary gear set 14 via a rotor shaft 36. The sun gear 28 is connected to the rotor shaft 36 of the drive unit 15 for conjoint rotation.

Alternatively, the planetary gear sets 6, 14 are arranged axially adjacent to one another. Further alternatively, it is conceivable to provide, instead of the second planetary gear set, a spur gear train, or the like, which is operatively connected to the second output shaft 17.

Figure 2:
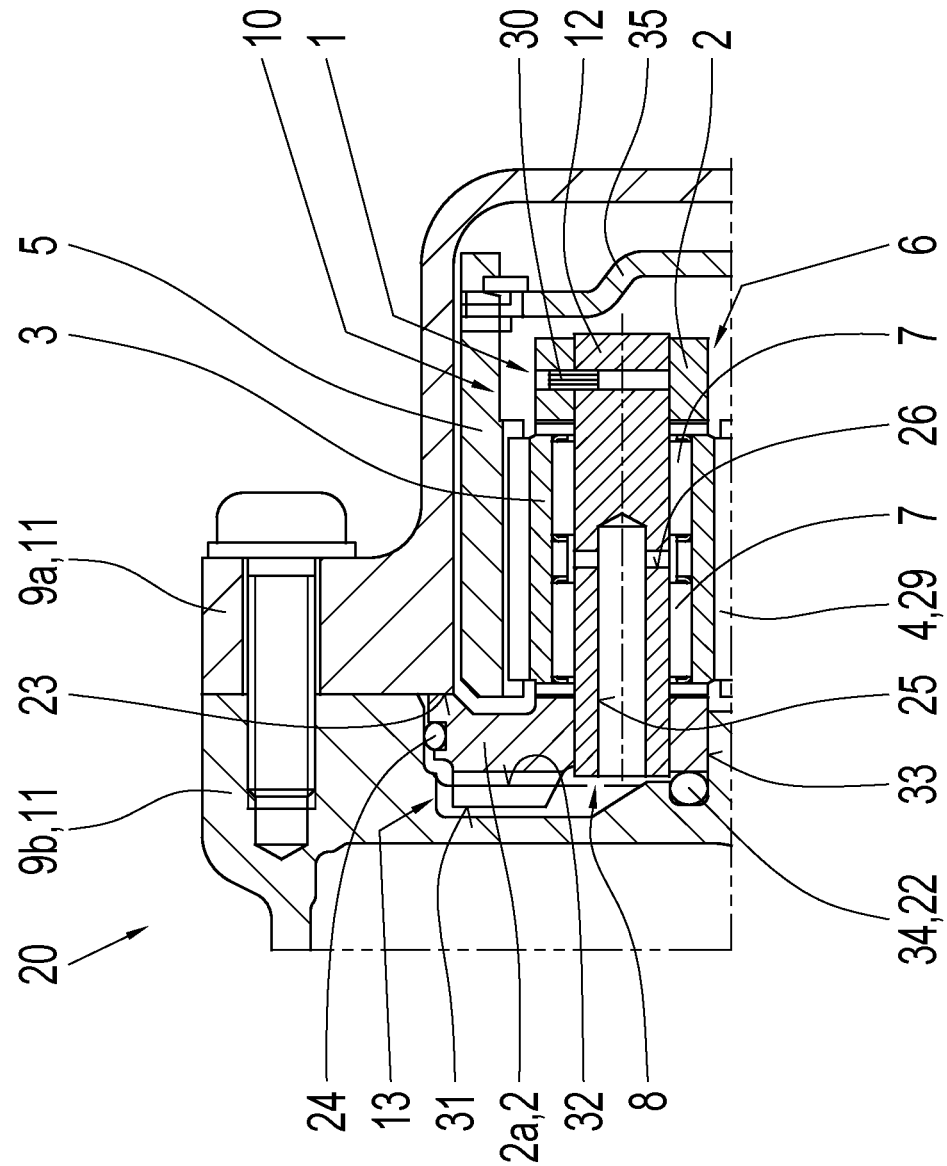
FIG. 2 shows a simplified schematic partial sectional view of the transmission according to the invention shown in FIG. 1.

According to FIG. 2, the first planetary gear set 6 of the transmission 1 is shown in greater detail. Accordingly, the planet carrier 2 of the first planetary gear set 6, such as a side piece 2a of the planet carrier 2, comes to rest on one side against a first axial contact surface 23 of a first stationary housing part 9a. On the axially opposite side, the planet carrier 2 is supported against the second stationary housing part 9b via a first sealing element 22, which is in the form of an O-ring. According to the first aspect of the invention, the first sealing element 22 is in the form of an axial seal and is axially compressed when the transmission is assembled, in particular when the two housing parts 9a, 9b are bolted together, such that an axial preload force is generated, which presses the planet carrier 2 axially against the first contact surface 23. The planet carrier 2 is therefore prevented from tilting relative to a rotation axis R (FIG. 1) of the at least first planetary gear set 6. In a first alternative, instead of the first sealing element 22, a spring element 34 is provided, which presses the planet carrier 2 in the direction of the first contact surface 23.

Moreover, at least a second sealing element 24 is arranged between the planet carrier 2 and the second housing part 9b. The second sealing element 24 is also an O-ring and is a radial seal situated radially between the planet carrier 2, such as the side piece 2a of the planet carrier 2, and the second housing part 9b. It would also be possible, for example, due to an alternative design of the housing interface, for the sealing element 24 to provide sealing between the planet carrier 2 and the first housing part 9a. The first sealing element 22 and the second sealing element 24 seal a lubricant chamber 8, through which lubricant is conveyed at a certain fluid pressure to the appropriate point to be lubricated, in particular to the planetary bearings 7. For the case in which a spring element 34 is provided for axially preloading the planet carrier 2, the first sealing element 22 is instead arranged, also as a radial seal, on an inner circumferential surface 33 of the planet carrier 2 of the first planetary gear set 6, the radial seal forming a press fit with the second housing part 9b. This press fit centers the planet carrier 2. Therefore, the first alternative, which includes the spring element 34, is a first addition to or development of the invention.

The axial contact surface 23 acts to axially secure the planet carrier 2 and thus the planet shafts 12 in a first axial direction. The planet shaft 12 is prevented from shifting in the opposite, axial direction by a pin 30.

The lubricant chamber 8 is arranged around the rotation axis R (FIG. 1) or the longitudinal axis of the first planetary gear set 6 for supplying the planetary bearings 7 with lubricant. The lubricant chamber 8 is formed spatially between the planet carrier 2 and the second stationary housing part 9b. In other words, the lubricant chamber 8 is spatially delimited by the planet carrier 2 and by the second stationary housing part 9b. The planet carrier 2 comes to rest against the second housing part 9b while also sealing the lubricant chamber 8. The planet carrier 2, the second housing part 9b and the sealing elements 22, 24 spatially delimit the lubricant chamber 8. Neither the lubricant nor the inflow to and outflow from the lubricant chamber 8 are shown here. From the lubricant chamber 8, the lubricant can enter ducts 25, 26 in the planet shafts 12 of the first planetary gear set 6. The planet shaft 12 has axially and radially extending ducts 25, 26 in order to fluidically connect the lubricant chamber 8 at least indirectly to the planetary bearings 7.

Within the lubricant chamber 8, a driving tooth system 13 is arranged on the end face of the side piece 2a of the planet carrier 2. The planet carrier 2 is secured via the driving tooth system 13 so as to be non-rotatable with respect to the second housing part 9b. As a second alternative, a meshing angle of a first tooth system 31 of the planet carrier 2 and a second tooth system 32 of the second housing part 9b of the driving tooth system 13 axially preloads the planet carrier 2 with respect to the first housing part 9a, such that the planet carrier 2 is prevented from tilting relative to a rotation axis R of the at least first planetary gear set 6. The second alternative is providable in addition to the first sealing element 23 and/or to the spring element 34.

According to a third alternative, which is also usable in addition to, or as a further development of the transmission 1 as described above, the fluid pressure of the lubricant guided in the lubricant chamber 8 is high enough that the planet carrier 2 is axially preloaded with respect to the first housing part 9a during the operation of the power train 20, such that the planet carrier 2 is prevented from tilting relative to a rotation axis R of the at least first planetary gear set 6.

The invention is not limited to the disclosed embodiments. Other embodiments or variations result for a person skilled in the art within the scope of the utilization of the present invention and within the scope of a precise analysis of the drawings, the description, and the patent claims. In particular, a person skilled in the art recognizes that the aspects of the invention described here, in particular the described embodiment variants, are arbitrarily combinable with one another. Depending on the available installation space, the power train 20 is alternatively configured such that the planet carrier 2 is preloaded against the second housing part 9b, while, vice versa, the preload force is supported against the first housing part 9a.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 transmission
2 planet carrier of the first planetary gear set
2a side piece of the planet carrier
3 planet gear of the first planetary gear set
4 sun gear of the first planetary gear set
5 ring gear of the first planetary gear set
6 first planetary gear set
7 planetary bearing
8 lubricant chamber
9a first stationary housing part of the transmission housing
9b second stationary housing part of the transmission housing
10 integral differential
11 transmission housing
12 planet shaft
13 driving tooth system
14 second planetary gear set
15 drive unit
16 first output shaft
17 second output shaft
18 stator carrier
19 stator
20 power train
21 rotor
22 first sealing element
23 first axial contact surface on the first stationary housing part
24 second sealing element
25 axial duct
26 radial duct
27 planet carrier of the second planetary gear set
28 sun gear of the second planetary gear set
29 ring gear of the second planetary gear set
30 pin
31 first tooth system
32 second tooth system
33 inner circumferential surface of the planet carrier of the first planetary gear set
34 spring element
35 coupling element
36 rotor shaft
37 planet gear of the second planetary gear set
R rotation axis of the first planetary gear set

The invention claimed is:

1. A transmission (1) for a power train (20) of a motor vehicle, the transmission (1) comprising:
a first stationary housing part (9a) having a first axial contact surface (23);
a second stationary housing part (9b);
a spring element (34) on the second stationary housing part (9b), the spring element (34) being axially compressible; and
a first planetary gear set (6) including a planet carrier (2), at least one planet gear (3), a sun gear (4), and a ring gear (5), each of the at least one planet gear (3) being rotatably mounted on the planet carrier (2) and meshing with both the sun gear (4) and the ring gear (5), the planet carrier (2) being fixed relative to one or both of the first stationary housing part (9a) and the second stationary housing part (9b), one side of the planet carrier (2) resting against the first axial contact surface (23), the spring element (34) acting on another side of the planet carrier (2) to axially preload the planet carrier (2) against the first axial contact surface (23) of the first stationary housing part (9a) to prevent the planet carrier (2) from tilting relative to a rotation axis (R) of the first planetary gear set (6).

2. The transmission (1) of claim 1, wherein the first stationary housing part (9a) and the second stationary housing part (9b) form a transmission housing (11) of the transmission (1), wherein the first stationary housing part (9a) and the second stationary housing part (9b) are attached to one another.

3. The transmission (1) of claim 2, wherein the first stationary housing part (9a) or the second stationary housing part (9b) forms a cover element of the transmission housing (11).

4. The transmission (1) of claim 1, wherein one or both of the first stationary housing part (9a) and the second stationary housing part (9b) at least one of axially secures or centers the planet carrier (2).

5. The transmission (1) of claim 1, further comprising a second sealing element (24) between the planet carrier (2) and the first stationary housing part (9a).

6. A power train (20) for a motor vehicle, the power train (20) comprising:
- at least one drive unit (15) for generating drive power; and
- the transmission (1) of claim 1, the transmission (1) at least indirectly distributing the drive power onto at least one output shaft (16, 17).

7. The transmission (1) of claim 1, further comprising a first sealing element (22) on an inner circumferential surface (33) of the planet carrier (2) and forming a press fit with the second stationary housing part (9b), the first sealing element (22) being axially compressible.

8. The transmission (1) of claim 1, wherein the planet carrier (2) is rotatably fixed via a driving tooth system (13) to the second stationary housing part (9b), a meshing angle of the driving tooth system (13) axially preloading the planet carrier (2) with respect to the first stationary housing part (9a) to prevent the planet carrier (2) from tilting relative to the rotation axis (R) of the first planetary gear set (6).

9. The transmission (1) of claim 1, wherein each of the at least one planet gear (3) is rotatably mounted on the planet carrier (2) via a planetary bearing (7),
- wherein a lubricant chamber (8) for supplying the planetary bearing (7) with lubricant extends at least partially around the rotation axis (R) of the first planetary gear set (6), the lubricant chamber (8) being spatially delimited by the planet carrier (2), the lubricant chamber (8) being sealed when the one side of the planet carrier (2) rests against the first axial contact surface (23).

10. A transmission (1) for a power train (20) of a motor vehicle, the transmission (1) comprising:
- a first stationary housing part (9a) having a first axial contact surface (23);
- a second stationary housing part (9b); and
- a first planetary gear set (6) including a planet carrier (2), at least one planet gear (3), a sun gear (4), and a ring gear (5), each of the at least one planet gear (3) being rotatably mounted on the planet carrier (2) and meshing with the sun gear (4) and the ring gear (5), one side of the planet carrier (2) resting against the first axial contact surface (23), another side of the planet carrier (2) resting at least indirectly against the second stationary housing part (9b), the planet carrier (2) being rotatably fixed via a driving tooth system (13) to the second stationary housing part (9b), a meshing angle of the driving tooth system (13) axially preloading the planet carrier (2) with respect to the first stationary housing part (9a) to prevent the planet carrier (2) from tilting relative to a rotation axis (R) of the first planetary gear set (6).

11. The transmission (1) of claim 10, wherein the driving tooth system (13) is at least partially defined on an end face of the planet carrier (2).

12. The transmission (1) of claim 1, wherein each of the at least one planet gear (3) is rotatably mounted on the planet carrier (2) via a planetary bearing (7),
- wherein a lubricant chamber (8) for supplying the planetary bearing (7) with lubricant extends at least partially around the rotation axis (R) of the first planetary gear set (6), the lubricant chamber (8) being spatially delimited by the planet carrier (2), the lubricant chamber (8) being sealed when the one side of the planet carrier (2) rests against the first axial contact surface (23).

13. The transmission (1) of claim 12, wherein the driving tooth system (13) is received within the lubricant chamber (8).

14. The transmission (1) of claim 12, wherein the first planetary gear set (3) further includes a planet shaft (12) on the planet carrier (2) for each of the at least one planetary bearing (7) for rotatably mounting the at least one planet gear (3).

15. The transmission (1) of claim 14, wherein each of the at least one planet shaft (12) includes ducts (25, 26) extending at least one of axially or radially and at least indirectly fluidically connecting the lubricant chamber (8) to the planetary bearing (7) accommodated on the planet shaft (12).

16. The transmission (1) of claim 10, further comprising an axially compressible element (22, 34) on the second stationary housing part (9b), the axially compressible element (22, 34) acting on the other side of the planet carrier (2) to axially preload the planet carrier (2) against the first axial contact surface (23) to prevent the planet carrier (2) from tilting relative to a rotation axis (R) of the first planetary gear set (6).

17. The transmission (1) of claim 10, further comprising a second sealing element (24) between the planet carrier (2) and the first stationary housing part (9a).

* * * * *